Figure 1:
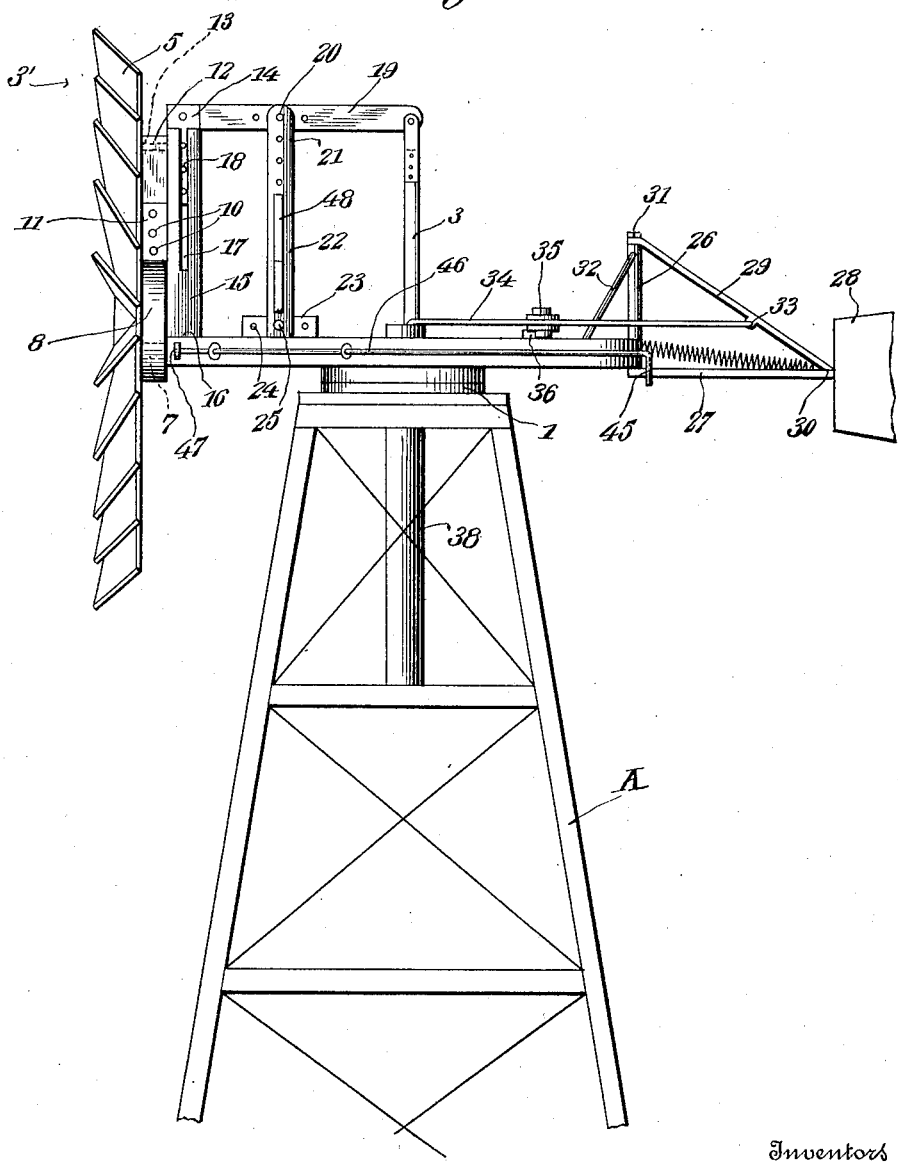

R. L. NEAL & R. A. ROBERSON.
WINDMILL.
APPLICATION FILED SEPT. 16, 1911.

1,055,942.

Patented Mar. 11, 1913.

2 SHEETS—SHEET 1.

Witnesses
J. F. Crawford
R. B. Cavanagh

Inventors
Rufus L. Neal,
Robert A. Roberson,
By Victor J. Evans
Attorney

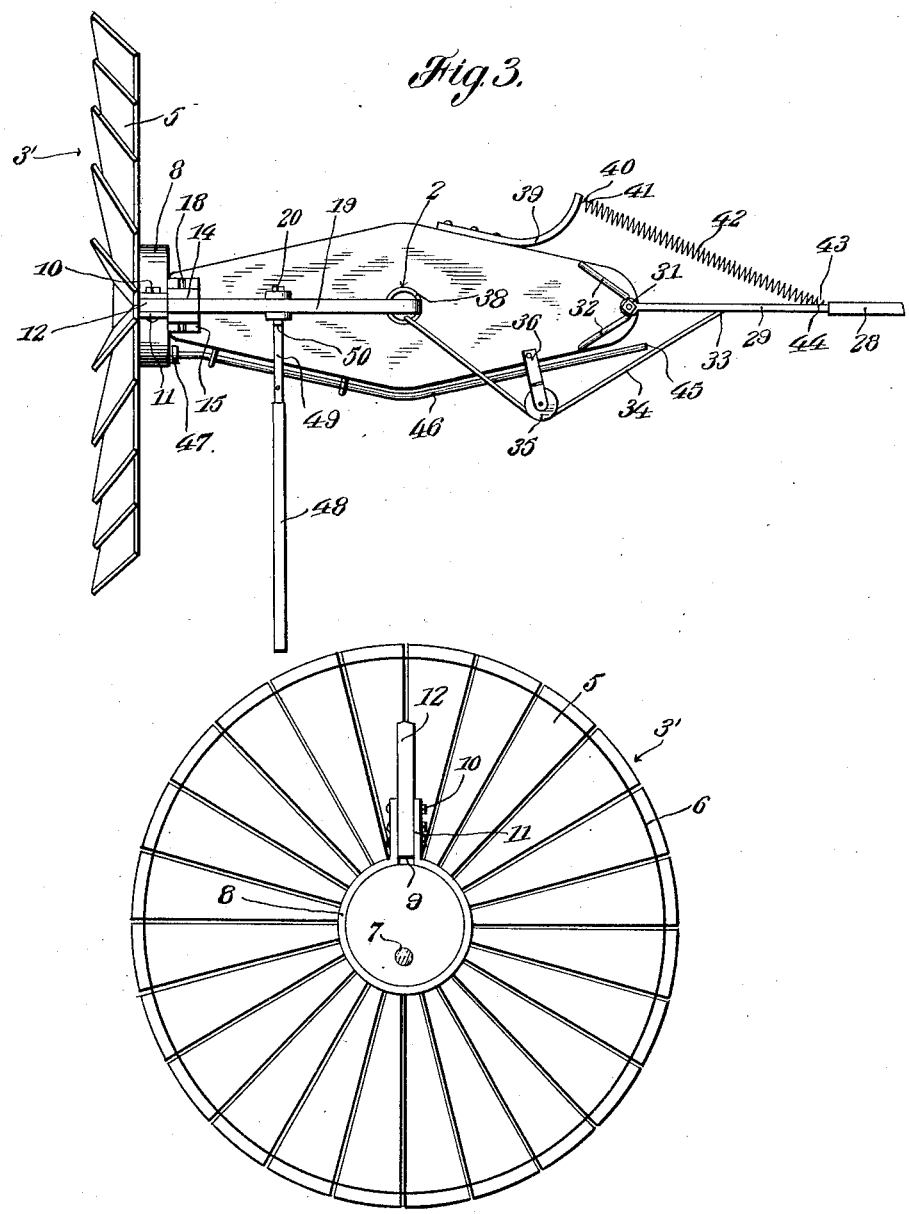

UNITED STATES PATENT OFFICE.

RUFUS L. NEAL AND ROBERT A. ROBERSON, OF MOUNTAIN VIEW, OKLAHOMA.

WINDMILL.

1,055,942. Specification of Letters Patent. Patented Mar. 11, 1913.

Application filed September 16, 1911. Serial No. 649,655.

*To all whom it may concern:*

Be it known that we, RUFUS L. NEAL and ROBERT A. ROBERSON, citizens of the United States, residing at Mountain View, in the county of Kiowa and State of Oklahoma, have invented new and useful Improvements in Windmills, of which the following is a specification.

This invention relates to certain novel and useful improvements in wind mills, and has particular application to a type of wind mill wherein the rotary motion of the wind wheel is converted into a reciprocating motion for the purpose of actuating a rod or plunger.

In carrying out our invention, it is our purpose to provide a wind mill which will embody in its construction the desired features of simplicity, strength, and durability and, furthermore, which will embrace a novel means for converting the rotary motion of the wheel to reciprocate a pump rod or the like.

With the above-recited objects and others of a similar nature in view, the invention consists in the construction, combination and arrangement of parts, set forth in and falling within the scope of the appended claims.

In the accompanying drawings:—Figure 1 is a view in side elevation of a wind mill embodying our invention. Fig. 2 is a rear view of the inner wheel and the crank rod connected thereto. Fig. 3 is a top plan view of our improved wind mill. Fig. 4 is an end view looking from the rear.

Referring now to the accompanying drawings in detail, the letter A designates the tower of our wind mill which is of ordinary construction and upon which is mounted the usual platform or turn table 1 having an opening 2 therethrough for the passage of the pump rod 3.

The wind wheel is indicated as an entirety by the numeral 3' and is formed of the hub portion and the radially extending segmental angularly arranged vanes 5, which are connected adjacent to their outer ends by a reinforcing ring 6. The wind wheel is eccentrically mounted upon the spindle 7, projecting from the turn table, while 8 designates a collar or band surrounding the hub at the back of the wheel, said band being split as at 9 and provided with an adjusting screw 10 for taking up the wear thereon. The parallel arms 11—11 extending upward from the band are secured to the link 12 which is pivoted at its upper end as at 13 to the sliding bar 14, sliding vertically between the guide posts 15—15, connected at their lower ends as at 16—16 to the turn table. These guide posts are longitudinally slotted as at 17—17 for the reception of a number of guide pins 18 projecting outward from the sides of the sliding bar, so that such bar is guided in its reciprocating movement. To the rear of this bar and preferably near the top thereof is connected one end of the lever or beam 19, said beam being fulcrumed as at 20 in the bifurcated end 21 of the supporting standard 22. This post is adjustably supported on the turn table, by means of the side brackets 23—23 which are provided with the longitudinal row of apertures 24 for the reception of the bolts 25 which connect the post to the brackets. It will be seen that the post may be adjusted in the brackets to any pair of alining holes, so that the stroke of the pump rod may be lengthened or shortened, as desired.

At the rear of the turn table, is mounted the tail post 26 to the lower end of which is pivotally connected the shank 27 of the tail 28, while 29 indicates an arm connected as at 30 to the tail and pivoted as at 31 upon the top of the post, so that said tail is free to swing.

32—32 designate brace rods extending between the top of the tail post and out to the sides of the turn table.

Connected to the tail at 33 is one end of a cable or chain 34, which leads over the pulley 35 carried by the suspending bracket 36 connected to the turn table or platform, said rope or cable then leading down through the tubular sleeve or shank 38 to a point at which it may be readily operated. This cable is employed to swing the tail of the wind mill to throw the same out of operation.

Connected to the rear of the turn table is a curved or angular rod 39 which is connected at 40 to the end 41 of the tension spring 42, the opposite end 43 of said spring being connected at 44 to the tail. When the tail is swung transversely by pulling upon the cable to throw the wind mill out of operation, it is designed to strike against the ends 45 of the brake rod 46 running longitudinally along the side edge of the turn table, the front end 47 of said rod lying directly back of the hub of the wind wheel and is designed to be brought into contact with the same to act as a brake. In addition to this brake rod, we employ an auxiliary tail 48, having the supporting rod 49, by means of which the tail is secured as at 50 to the turn table directly behind the hub of the wheel, so that when the wind is too strong, the wheel will be thrown out of operation, owing to the wind impinging upon the auxiliary tail 48 and thereby turning or throwing the wheel out of the wind.

From the above description, taken in connection with the accompanying drawings, the construction and operation of our invention will be readily apparent. When the tail is in position in alinement with the beam or lever, and the wind mill in operation, the wheel under the influence of the wind is rotated, and being eccentrically mounted and connected to the link through the medium of the band surrounding the hub of the wheel, will impart motion to said rod and vertically reciprocate the bar connected to the beam, thus in turn reciprocating the pump rod of the device. When desired the wheel may be thrown out of operation by swinging the tail around to actuate the brake member as heretofore described.

It will be seen that we have provided a simple and efficient form of wind mill by means of which the pump rod is positively actuated.

While we have herein shown and described one particular embodiment of our invention, we wish it to be understood that we do not limit ourselves to all the precise details of construction herein set forth, as modification and variation may be made without departing from the spirit of the invention or exceeding the scope of the appended claims.

We claim:—

1. A wind mill comprising a supporting tower, a turn table upon the tower, a wind wheel journaled upon the turn table for rotary movement and eccentric thereon and provided with a hub, a band encircling the hub, vertical guide posts connected to the turn table and spaced apart adjacent the hub, a bar sliding within the guide posts and provided with pin engaging slots in the said posts, a link connected at one end to the said band and having its opposite end pivotally connected to the sliding bar, a walking beam having one extremity pivotally connected to said sliding bar, a standard, a pivotal connection between the standard and the walking beam, an adjustable connection between said standard and the turn table, and a pump rod connected to the free end of the walking beam beyond the standard with respect to the sliding bar.

2. In a wind mill, a tower, a turn table upon the tower, a wind wheel journaled upon the turn table for rotary movement and eccentric thereon and provided with a hub, a pump rod or plunger, connections between said wind wheel and pump rod whereby the pump rod will be reciprocated on the rotary movement of the wind wheel, a tail vane pivotally connected to the end of the turn table opposite from the wind wheel and adapted to swing in a horizontal plane, means for swinging the tail vane, and a rigid brake rod slidably disposed upon the turn table and having one extremity located adjacent the hub on the wind wheel and the opposite extremity disposed in the path of movement of the tail vane whereby in the movement of the tail vane to render the wind wheel operative, the brake rod will be slid longitudinally of the turn table to engage the hub on the wind wheel and stop such wheel.

3. In a wind mill, a tower, a turn table upon the tower, a wind wheel rotatably mounted upon one end of the turn table and provided with a hub, a tail vane pivotally mounted upon the end of the turn table opposite from the wind wheel and adapted to swing in a horizontal plane, a cable connected to one side of the tail vane for moving the same horizontally to render the wind wheel inoperative, a rigid brake rod slidably mounted upon the turn table and having one end disposed in proximity to the hub on the wind wheel and the opposite end arranged in the path of movement of the tail vane whereby in the movement of the tail vane under the action of the cable the hub end of the brake rod will stop the wind wheel, an angular rod connected to one side of the turn table and upon the side of the tail vane opposite from the cable, and a tension spring having one extremity connected to said angular rod and the opposite end fastened to the tail vane to restore the tail vane to an operative position upon the release of the cable.

In testimony whereof we affix our signatures in presence of two witnesses.

RUFUS L. NEAL.
ROBERT A. ROBERSON.

Witnesses:
ARTHUR DAVIS,
CHARLES H. JOHNSON.

Copies of this patent may be obtained for five cents each, by addressing the "Commissioner of Patents, Washington, D. C."